United States Patent Office 3,509,149
Patented Apr. 28, 1970

3,509,149
ARYL AND ARALKYL 3,4-DIHYDRO-2-(1H)-QUINAZOLINONES
John W. Cusic and William E. Coyne, Skokie, Ill., assignors to G. D. Searle & Co., Chicago, Ill., a corporation of Delaware
No Drawing. Filed May 10, 1968, Ser. No. 728,329
Int. Cl. C07d 51/34; A61k 27/00
U.S. Cl. 260—251          5 Claims

ABSTRACT OF THE DISCLOSURE

The present 3,4-dihydro-2(1H)-quinazolinones have an aryl or an aralkyl substituent at the 1- and 3-positions. These compounds possess anti-inflammatory and anti-protozoal activity. They are prepared by reacting the appropriate N-monosubstituted 3,4-dihydro-2(1H)-quinazolinone with a strong base and an appropriate halide, or by cyclization of an appropriately substituted 2-aminobenzylamine.

SUMMARY OF THE INVENTION

The present invention relates to a group of 3,4-dihydro-2(1H)-quinazolinones having an aryl or an aralkyl substituent at the 1- and 3-positions. More particularly, it relates to a group of compounds having the following general formula

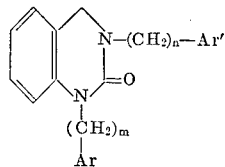

wherein $m$ and $n$ are each selected from the group consisting of 0 and 1; Ar is selected from the group consisting of phenyl, tolyl, xylyl, halophenyl, and methoxyphenyl; and Ar' is selected from the group consisting of phenyl, tolyl, xylyl, halophenyl, and mono- and poly-methoxyphenyl. The halophenyl radicals referred to above include fluorophenyl, cholorphenyl, bromophenyl, and iodophenyl.

The compounds of the present invention are prepared by the reaction of an N-monosubstituted 3,4-dihydro-2(1H)-quinazolinone with a strong base such as sodium hydride and an appropriate halide. This procedure is preferred when a halide such as benzyl chloride can be used.

Alternately, the compounds of the present invention can be prepared by the cyclization of a diamine of the formula

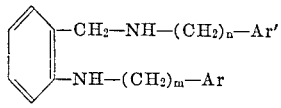

wherein $m$, $n$, Ar and Ar' are each defined as above. The diamine can be cyclized using phosgene or N,N'-carbonyldiimidazole although, in the latter case, it may be necessary to use a strong base such as sodium hydride to complete the cyclization. A similar procedure is used for the preparation of the intermediate monosubstituted 3,4-dihydro-2(1H)-quinazolinones referred to earlier. Thus, for example, an N-substituted 2-aminobenzylamine is reacted with phosgene or N,N'-carbonyldiimidazole to close the ring and gives the desired quinazolinone.

The compounds of the present invention are useful because of their pharmacological properties. In particular, the present compounds possess anti-inflammatory activity. Thus, they have a phenylbutazone-like effect on edematous conditions. The anti-inflammatory utility of the present compounds is demonstrated by the results of a standard test which determines the capacity of a compound to inhibit the edema induced in rats by injection of carrageenin. The procedure is a modification of one described by Winter et al., Proc. Soc. Exper. Biol. and Med., 111, 544 (1962). A compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 grams. A like group of rats is concurrently administered the same vehicle alone and it serves as controls. Precisely 1 hour later, each animal is injected under the planter surface of each hind foot with 0.1 ml. of an aqueous 1% solution of carrageen in (Marine Colloids, Inc., Type 402). A compound is considered anti-inflammatory if the average total circumference of the two hind feet treated therewith, which is measured in arbitrary units 5 hours after the carrageenin, is significantly ($P<0.05$) less than the corresponding value for the control group. Thus, subcutaneous administration of 25 mg. of 1 - benzyl-3-(4-chlorophenyl)-3,4-dihydro-2(1H)-quinazolinone or 1-benzyl-3 - (3,4,5 - trimethoxyphenyl)-3,4-dihydro-2(1H)-quinazolinone produced an anti-inflammatory effect when tested in the manner described above.

The present compounds also possess anti-protozoal activity. Thus, they inhibit the growth of protozoa such as *Tetrahymena gelleii* and can therefore be combined with various known excipients and adjuvants in the form of dusts, solutions, suspensions, ointments, and sprays to provide compositions useful for disinfecting purposes.

The following examples are presented to further illustrate the present invention. In these examples, temperatures are indicated in degrees centrigrade (° C.) and quantities are indicated in parts by weight.

EXAMPLE 1

A suspension of 96 parts of isatoic anhydride, 72.7 parts of 2,4-dimethylaniline, and 1.8 parts of powdered sodium hydroxide in 600 parts of dioxane is stirred and heated at 70–80° C. for 2 hours and then at 100° C. for 2 hours. The resulting solution is poured into 1500 parts of water and the solid which forms is separated by filtration and recrystallized from ethanol to give 2-amino-2',4'-dimethylbenzanilide melting at about 125–135° C.

To a hot suspension of 20 parts of lithium aluminum hydride in 500 parts of dioxane there is added portionwise, with stirring under nitrogen, a solution of 62.2 parts of 2-amino-2',4'-dimethylbenzanilide in 700 parts of dioxane and the resultant solution is refluxed with stirring for 18 hours. The mixture is then decomposed by the successive cautious addition of 20 parts of water, 20 parts of 15% aqueous sodium hydroxide solution, and then 60 parts of water. The mixture is then filtered and the solvent is evaporated from the filtrate to leave a white crystalline residue. This is recrystallized from a mixture of ethanol and water to give 2-amino-N-(2,4-dimethylphenyl)benzylamine melting at about 65–75° C.

To a stirred solution of 37.2 parts of 2-amino-N-(2,4-dimethylphenyl)benzylamine in 870 parts of toluene there is added, at room temperature, a solution of 25 parts of phosgene in 130 parts of toluene over a period of 45 minutes. When the addition is complete, the solution is stirred at reflux for 1 hour. The toluene solvent is then evaporated under reduced pressure to leave a dark residue which is recrystallized twice from ethanol to give 3-(2,4-dimethylphenyl) - 3,4 - dihydro - 2(1H) - quinazolinone as white crystals melting at about 175–200° C.

EXAMPLE 2

The procedure of Example 1 is repeated using isatoic anhydride and the appropriate amine to give the following compounds:

3-(4-chlorophenyl)-3,4-dihydro - 2(1H)-quinazolinone melting at about 203–205° C.

3-phenyl-3,4-dihydro - 2(1H)-quinazolinone melting at about 182–187° C.

3 - (3 - fluorophenyl) - 3,4 - dihydro - 2(1H) - quinazolinone.

3-(4-tolyl)-3,4-dihydro-2(1H)-quinazolinone.

3 - (4 - methoxyphenyl) - 3,4 - dihydro - 2(1H) - quinazolinone.

3 - (3,4,5 - trimethoxyphenyl) - 3,4 - dihydro - 2(1H)-quinazolinone.

3-benzyl-3,4-dihydro-2(1H)-quinazolinone.

EXAMPLE 3

To a stirred refluxing solution of 63 parts of oxalyl chloride in 1000 parts of methylene chloride is added a solution of 85 parts of diphenylamine in 1330 parts of methylene chloride over a period of about 2 hours. The solution is then refluxed for two hours and cooled and 225 parts of aluminum chloride is added over a period of 1 hour. The mixture is then stirred for 16 hours at room temperature and poured into an excess of ice. The methylene chloride layer is then separated, washed with dilute hydrochloric acid, and dried over magnesium sulfate. The solvent is then evaporated to leave a residual solid which is recrystallized from benzene to give N-phenylisatin melting at about 135–138° C.

To a stirred solution of 61 parts of N-phenylisatin in 800 parts of methylene chloride is added 78 parts of 85% pure 3-chloroperbenzoic acid in 2000 parts of methylene chloride. The mixture is stirred for 72 hours at room temperature and then 90 parts of calcium hydroxide is added. It is then stirred for 30 minutes and filtered and the solid is washed with methylene chloride. The solvent is evaporated from the filtrate to leave a solid residue which is recrystallized from a benzene to given N-phenylisatoic anhydride melting at about 177–178° C.

A suspension of 14.9 parts of N-phenylisatoic anhydride, 11.4 parts of 3,4,5-trimethoxyaniline, and 0.5 part of powdered sodium hydroxide in 300 parts of dioxane is slowly heated to reflux and then refluxed for 4 hours. the mixture is then filtered and the dioxane is evaporated to leave a solid residue which is recrystallized from ethanol to give 2-anilino-3′,4′,5′-trimethoxybenzanilide melting at about 175–176° C.

To a stirred suspension of 5.0 parts of lithium aluminum hydride in 90 parts of tetrahydrofuran is added, under nitrogen, a solution of 17.7 parts of 2-anilino-3′,4′,5′-trimethoxybenzanilide in 90 parts of tetrahydrofuran. The reaction mixture is stirred and refluxed for 18 hours, cooled and decomposed by the successive addition of 5 parts of water, 5 parts of 15% aqueous sodium hydroxide, and 15 parts of water. The mixture is then filtered and the tetrahydrofuran is evaporated to give 2-anilino - N - (3,4,5 - trimethoxyphenyl)benzylamine as an amber oil which crystallizes on standing.

EXAMPLE 4

To a stirred solution of 5.2 parts of 3-(4-chlorophenyl)-3,4-dihydro-2(1H)-quinazolinone in 110 parts of dimethyl sulfoxide under nitrogen is added 0.86 parts of sodium hydride as a 56% suspension in oil. The mixture is stirred for 30 minutes, 3.16 parts of benzyl chloride is added, and the solution is stirred for 18 hours at room temperature. It is then poured into water and extracted with ether. The ether extracts are combined and dried, and the solvent is evaporated to leave a residual white solid. This is recrystallized from ethanol to give 1-benzyl-3-(4-chlorophenyl) - 3,4 - dihydro - 2(1H)-quinazolinone melting at about 117–121° C. this compound has the following formula

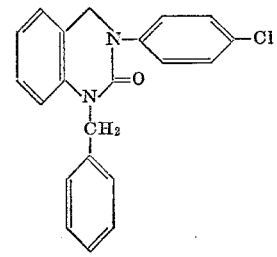

EXAMPLE 5

3.4 parts of 3 - (4-chlorophenyl) - 3,4 - dihydro-2(1H)-quinazolinone is reacted first with 0.56 parts of sodium hydride and then with 2.5 parts of 4-chlorobenzyl chloride in dimethyl sulfoxide according to the procedure described in Example 5. In this case, a solid is obtained when the reaction mixture is poured into water. This is separated by filtration to give 1-(4-chlorobenzyl)-3-(4-chlorophenyl) - 3,4 - dihydro - 2(1H)-quinazolinone melting at about 147–152° C.

EXAMPLE 6

2,5-dimethylbenzyl chloride is reacted with 3-(4-chlorophenyl) - 3,4 - dihydro-2(1H)-quinazolinone according to the procedure described in Example 5 to give 3-(4-chlorophenyl) - 1 - (2,5 - dimethylbenzyl) - 3,4 - dihydro-2(1H)-quinazolinone melting at about 156–162° C. Similarly, 4-methoxybenzyl chloride is reacted with 3-(4-chlorophenyl) - 3,4 - dihydro - 2(1H) - quinazolinone to give 3 - (4 - chlorophenyl) - 1 - (4 - methoxybenzyl)-3,4-dihydro-2(1H)-quinazolinone melting at about 172–175° C. Likewise, 3-fluorobenzyl chloride is reacted with 3-(4-chlorophenyl)-3,4-dihydro-2(1H)-quinazolinone to give 3 - (4 - chlorophenyl) - 1 - (3 - fluorobenzyl) - 3,4 - dihydro-2(1H)-quinazolinone.

EXAMPLE 7

By using the procedure of Example 5 and the appropriate starting materials, the following compounds are obtained:

1,3-dibenzyl-3,4-dihydro-2(1H)-quinazolinone melting at about 96–101° C.

1-benzyl-3-phenyl-3,4-dihydro-2(1H)-quinazolinone.

1-benzyl-3-(4-tolyl)-3,4-dihydro-2(1H)-quinazolinone.

1benzyl - 3 - (2,4-dimethylphenyl)-3,4-dihydro-2(1H)-quinazolinone.

1-benzyl - 3 - (3-fluorophenyl) - 3,4 - dihydro-2(1H)-quinazolinone.

1-benzyl - 3 - (4-methoxyphenyl)-3,4-dihydro-2(1H)-quinazolinone.

1 - benzyl - 3 - (3,4,5-trimethoxyphenyl)-3,4-dihydro-2(1H)-quinazolinone melting at about 93–97° C. after recrystallization from ethanol.

1 - (4-chlorobenzyl)-3-(3,4,5-trimethoxyphenyl)-3,4-dihydro-2(1H)-quinazolinone melting at about 243–246° C. after recrystallization from ethanol.

1 - (3 - methylbenzyl)-3-(3,4,5-trimethoxyphenyl)-3,4-dihydro-2(1H)-quinazolinone melting at about 187–190° C. after recrystallization from ethanol.

EXAMPLE 8

To a stirred solution of 10 parts of 2-anilino-N-(3,4,5-trimethoxyphenyl)benzylamine in 45 parts of tetrahydrofuran is added 10 parts of N,N-carbonyldiimidazole. The solution is stirred at room temperature for 3 hours and then refluxed for 18 hours. The reaction mixture is cooled and poured into water and then extracted with ether. The combined ether extracts are dried over potassium carbonate and the solvent is evaporated to leave an amber oil. The oil is dissolved in benzene and chromatographed on a silica column. The column is eluted with solutions containing increasing quantities of ethyl acetate in benzene. The eluates obtained using 40% ethyl acetate in benzene are combined, the solvent is evaporated, and the solid residue is recrystallized from ethanol to give a solid product which is 2-anilino-N-(imidazole-1-carbonyl)-N-(3,4,5-trimethoxyphenyl)benzylamine. To a solution of 2.4 parts of this amine in 70 parts of N,N-dimethylformamide is added 0.25 part sodium hydride as a 56% suspension in oil, and the solution is stirred at 50° C. under nitrogen for 3 hours. The reaction mixture is then poured into water and the precipitate which forms is separated by filtration and recrystallized from ethanol to give 1-phenyl-3 - (3,4,5-trimethoxyphenyl)-3,4-dihydro-2(1H)-quinazolinone melting at about 156–157° C. This compound has the following formula

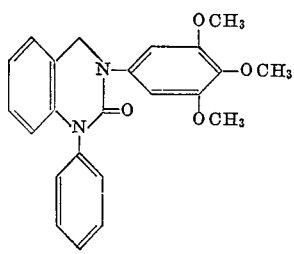

What is claimed is:
1. A compound of the formula

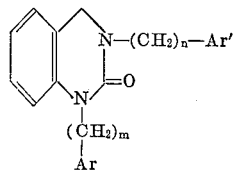

wherein $m$ and $n$ are each a whole number between 0 and 1 inclusive; Ar is selected from the group consisting of phenyl, tolyl, xylyl, halophenyl, and methoxyphenyl; and Ar′ is selected from the group consisting of phenyl, tolyl, xylyl, halophenyl, methoxyphenyl, and trimethoxyphenyl.

2. A compound according to claim 1 which is 1-benzyl-3-(4-chlorophenyl)-3,4-dihydro-2(1H)-quinazolinone.

3. A compound according to claim 1 which is 3-(4-chlorophenyl) - 1 - (4-methoxybenzyl) - 3,4 - dihydro-2(1H)-quinazolinone.

4. A compound according to claim 1 which is 1-phenyl-3 - (3,4,5-trimethoxyphenyl)-3,4-dihydro-2(1H)-quinazolinone.

5. A compound according to claim 1 which is 1-benzyl-3 - (3,4,5-trimethoxyphenyl)-3,4-dihydro-2(1H)-quinazolinone.

References Cited

Haraoka et al., C.A. 66, 115732v (1967).

ALEX MAZEL, Primary Examiner

R. V. RUSH, Assistant Examiner

U.S. Cl. X.R.

424—251

UNITED STATES PATENT OFFICE
CERTIFICATE OF CORRECTION

Patent No. 3,509,149     Dated April 28, 1970

Inventor(s) John W. Cusic and William E. Coyne

It is certified that error appears in the above-identified patent and that said Letters Patent are hereby corrected as shown below:

Column 1, line 2, "Dihydro-2-(1H)" should read -- Dihydro-2(1H) --; column 1, line 39, "0 and $l$" should read -- 0 and 1 --. Column 3, line 41, "given" should read -- give --. Column 4, line 25, "Example 5" should read -- Example 4 --; column 4, line 72, "N,N-" should read -- N,N'- --.

SIGNED AND
SEALED

SEP 29 1970

(SEAL)
Attest:

Edward M. Fletcher, Jr.
Attesting Officer

WILLIAM E. SCHUYLER, JR.
Commissioner of Patents